United States Patent [19]

Blevins

[11] Patent Number: 4,934,260
[45] Date of Patent: Jun. 19, 1990

[54] FOOD COOKER AND SMOKER

[76] Inventor: Mack F. Blevins, 819 SE. Madison Blvd., Bartlesville, Okla. 74006

[21] Appl. No.: 404,537

[22] Filed: Sep. 8, 1989

[51] Int. Cl.$^5$ .............................................. A23B 4/04
[52] U.S. Cl. ..................................... 99/482; 99/331; 99/476; 126/4; 126/21 A
[58] Field of Search ................. 99/331, 339, 340, 341, 99/342, 450, 468, 467, 474, 476, 482, 483, 427, 426; 126/283, 1 R, 4, 19 R, 25 R, 21 A

[56] References Cited

U.S. PATENT DOCUMENTS

| | | | |
|---|---|---|---|
| 221,455 | 11/1879 | Goodin | 99/476 |
| 762,588 | 6/1904 | Jackson | 126/4 |
| 888,324 | 5/1908 | Glenk | 126/4 |
| 3,561,348 | 2/1971 | Weir, Sr. | 99/482 |
| 3,792,654 | 2/1974 | Turner | 99/427 |
| 4,348,948 | 9/1982 | Allison | 99/339 |
| 4,469,020 | 9/1984 | Hamilton et al. | 99/450 |
| 4,700,618 | 10/1987 | Cox, Jr. | 126/25 R |
| 4,702,224 | 10/1987 | Griffith | 99/482 |
| 4,757,756 | 7/1988 | Van Marr | 126/21 A |
| 4,869,163 | 9/1989 | Haskins | 99/481 |

Primary Examiner—Timothy F. Simone
Attorney, Agent, or Firm—Robert K. Rhea

[57] ABSTRACT

A food cooking and smoking apparatus comprising a rectangular container having a horizontal firebox in its depending or bottom portion. The firebox is provided with a fuel receiving grate and an electric motor driven fan for inducing a draft of air into the firebox for generating heat and smoke. A smoke stack connected with the end of the firebox opposite its fan equipped end is provided with dampers and slots for regulating the amount of smoke contained by the enclosure around the meat or other food products therein.

5 Claims, 2 Drawing Sheets

FOOD COOKER AND SMOKER

The present invention relates to smoke producers for use in the curing of meat products and more particularly to a combination cooker and smoker for food stuff.

BACKGROUND OF THE INVENTION

1. Field of the Invention

Smoke producers for curing meat are well known and have generally comprised an enclosure in which the food stuff is stored with smoke introduced into this enclosure. The enclosure may be joined to a firebox in which the fuel is placed and smoke rises through openings between the firebox and the smoke container or the smoke may be ducted to the smoke box containing the food.

2. Description of the Prior Art

Prior patents disclose a large number of barbecue type fireboxes which also smoke flavor the meat. These units are frequently portable, being mounted on wheels for ease of mobility or are usually a relatively small fire and meat product containing unit positioned in one portion of a restaurant or other food serving establishment.

Other patents disclose stationary smoke producers which may contain the firebox. The firebox being supplied with fuel which may be gas or the like which maintains a primary source of combustion with a secondary source of combustion being introduced into the firebox in the form of sawdust or wood chips particularly parts of hardwood to impart a desired flavor to meats or other food being smoked.

This invention utilizes several of the desirable features of a number of prior art devices such as a forced draft for the fuel which is automatically controlled by the temperature in the meat compartment during a cooking process and further provides control of the amount of smoke contained by the smoking section of the device. The device is further structurally arranged for ease in placing or removing food stuff therefrom.

SUMMARY OF THE INVENTION

A generally rectangular upright housing contains a firebox open toward one end of the housing with a blower and fan inducing a forced draft into the firebox with the smoke stack exhaust of the firebox extending upwardly through an upper smoke and meat containing compartment having doors opening laterally of the unit.

Manually operated damper controls regulate the quantity or density of smoke within the smoke compartment or exhausts the smoke when the unit is used for cooking food stuffs.

The principal object of this invention is to provide an apparatus which conveniently uses any desired hardwood such as oak, hickory, black jack, or other woods for smoke cooking of food stuffs particularly meats.

DESCRIPTION OF THE PREFERRED EMBODIMENTS

Figure 1:
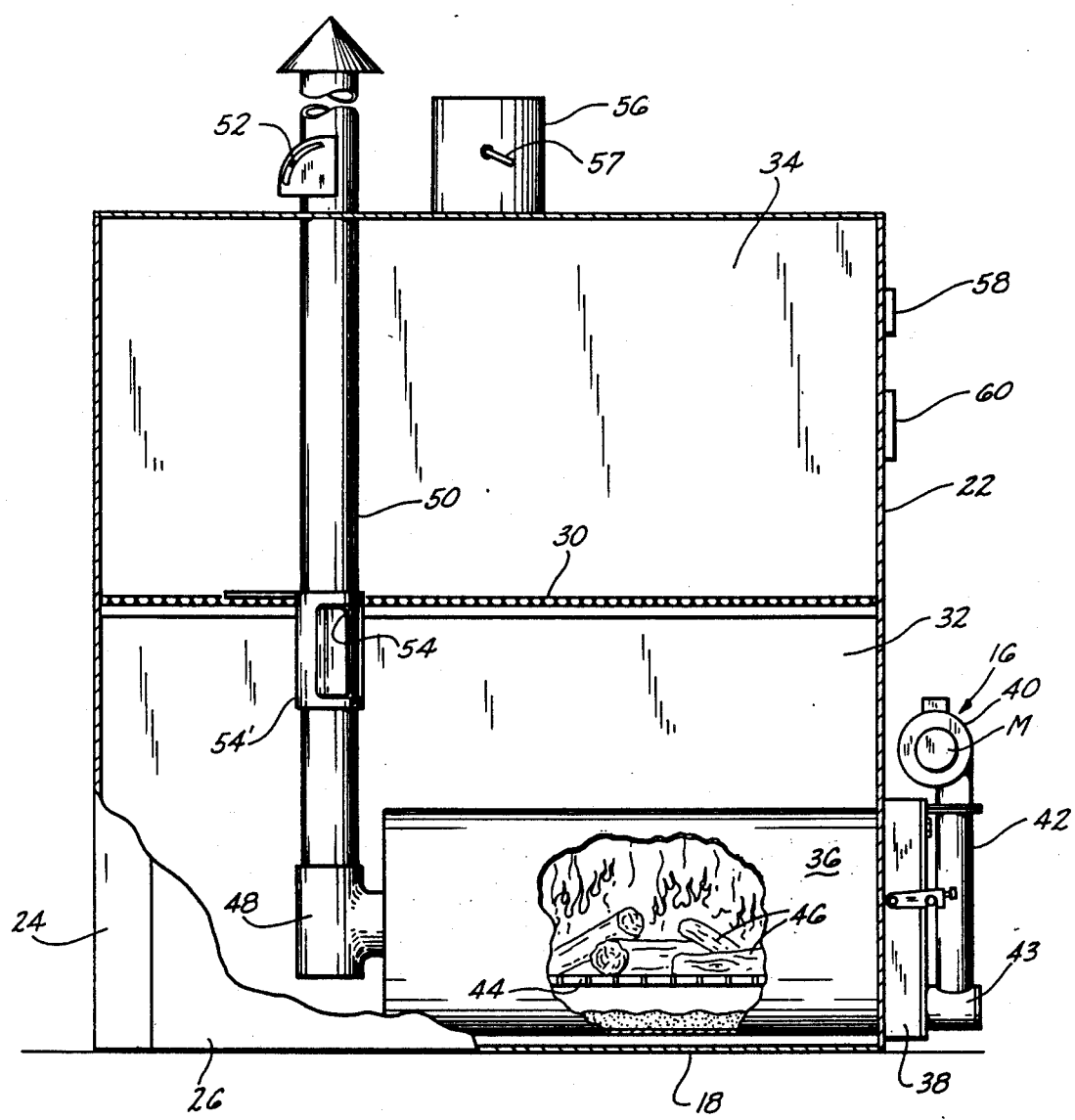
FIG. 1 is a vertical cross sectional view taken substantially along the line 1—1 of FIG. 2 with a portion of the firebox broken away for clarity; and, FIG. 2 is a perspective view of the cooking device.
Figure 2:
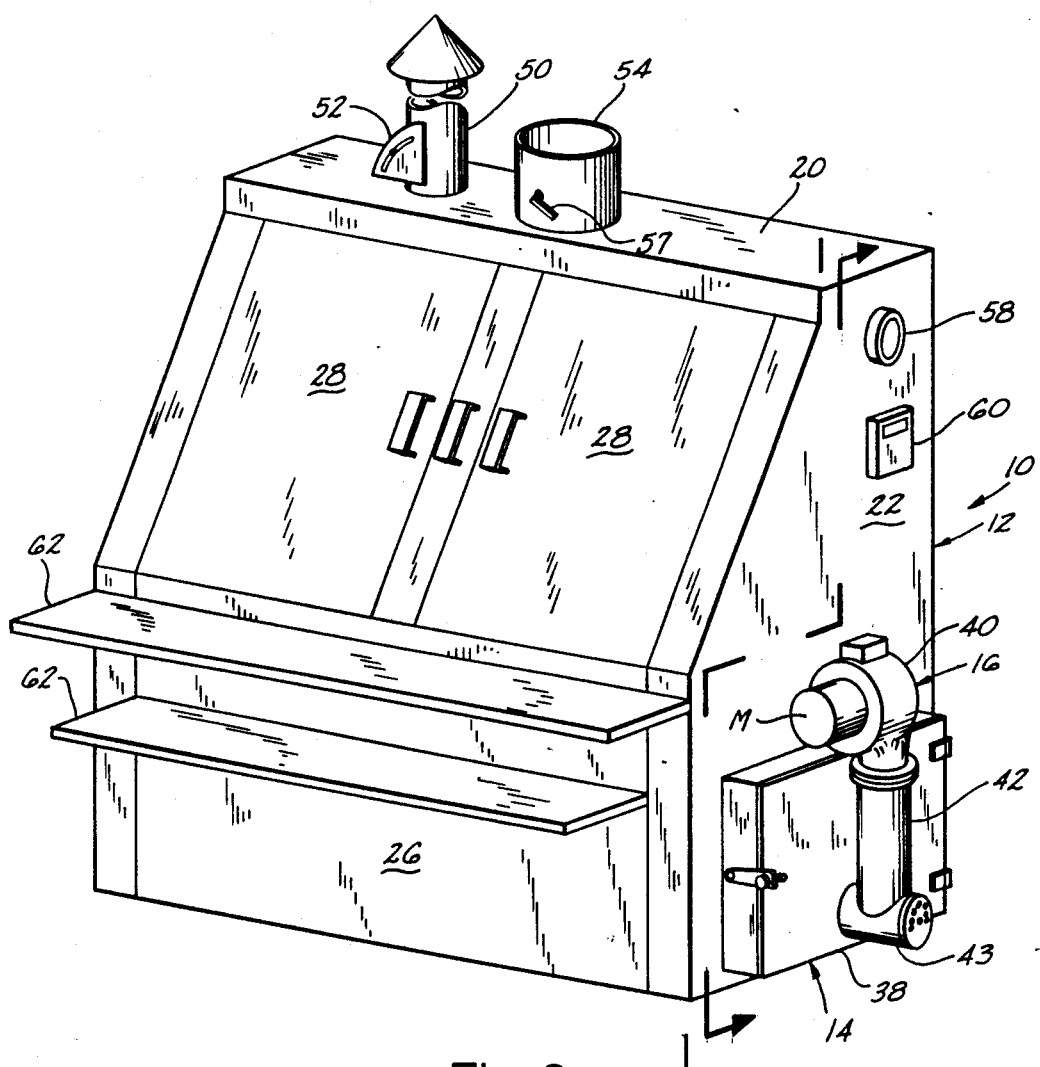

Like characters of reference designate like parts in those figures of the drawings in which they occur.

In the drawings:

The reference numeral 10 indicates the cooking device as a whole which is upright rectangular in general configuration including a housing 12 having a firebox means 14 equipped with blower means 16.

The housing 12 comprises a horizontal bottom 18, a top 20, end walls 22 and 24, a back wall, not shown, a forward wall 26 with the upper portion of the forward wall being inclined rearwardly and upwardly and closed by a pair of doors 28.

The housing 12 is horizontally divided by a partition 30 formed from expanded metal or the like which freely admits heat from the lower or firebox compartment 32 into the smoke compartment 34 thereabove.

The firebox means 14 comprises a horizontal generally cylindrical firebox 36 having one end open through the housing end wall 22 and closed by a door 38 hingedly mounted on the end wall 22.

The blower means 16 comprises a motor M drivably connected with a fan or blower, not shown, contained by a housing 40. The fan housing exhaust is connected by tubing 42 with the bullhead inlet of a tee 43 communicating at one of its running outlets with the firebox 36 through the door 38. The other running outlet of the tee 43 is closed by an apertured cap 43' providing a limited firebox draft when the fan is idle.

Spaced upwardly from the lower limit the firebox tube 36 contains a horizontally disposed grate 44 on which wood 46 or other fuel is placed. The other end of the firebox is connected with the bullhead inlet of a tee 48 with a vertically disposed elongated tube 50 connected with one running outlet of the tee and extending upwardly through the partition 30 and the smoke compartment 34 with the outer end of the tube 50 being provided with a rain cap damper means 52 for the purpose believed obvious. The other running outlet of the tee 48 remains open to assist in an upward draft of smoke through the tube 50.

Intermediate its ends the vent tube 50 is further provided with one or more slots 54 extending in a vertical direction through the wall of the tube 50 for exhausting smoke from the tube to the compartments 32 and 34 during meat smoking action as presently explained. Each slot or slots 54 and tube 50 is surrounded by a manually regulated slotted sleeve 54'.

The smoke compartment 34 is provided with an exhaust tube 56 substantially greater in diameter than the diameter of the tube 50 for exhausting smoke as presently explained. A lever 57 connected with the shaft of a damper opens and closes the tube 56.

A smoke compartment temperature gauge 58 is mounted on the housing end wall 22 and a thermostat 60 mounted on this end wall is connected with the temperature indicator and fan motor M by electrical wiring and controls, not shown, in a conventional manner.

Further, the housing front wall 26 is provided with a pair of horizontal vertically spaced shelves 62 for placing food thereon when removing or placing the food within the smoke compartment 34.

OPERATION

In operation fuel is placed in the firebox 36 and ignited in any conventional manner. Food is then placed within the smoke compartment 34 either upon the horizontal shelf-type partition 30 or upon racks or hooks mounted within the smoke compartment or attached to the inner surface of its walls.

The thermostat is adjusted so that a desired temperature is maintained within the smoke compartment which regulates the amount of air admitted to the firebox.

The operator manually adjusts the sleeve 54' controlling the amount of smoke discharged from the smoke tube 50 after closing or partially closing the damper 52 so that smoke is forced outward into the firebox compartment 32 and or the smoke compartment 34.

When using the device as a cooker the smoke tube 50 is open and similarly the conventional damper 57 for opening or closing the smoke compartment exhaust 56 is maintained open.

Obviously the invention is susceptible to changes or alterations without defeating its practicability. Therefore, I do not wish to be confined to the preferred embodiment shown in the drawings and described herein.

I claim:

1. A cooking and smoking apparatus, comprising:
    a housing having a top, a bottom, opposing end and side walls, one said housing end wall having an opening and one said housing side wall having a door closed food access opening;
    food supporting rack means within said housing;
    firebox means including an elongated tubular fuel containing firebox having one end communicating with the end wall opening;
    smoke control means including a firebox vent connected with the other end of said firebox and projecting vertically through said housing;
    means generating a forced air draft longitudinally through said firebox; and,
    control means for maintaining a predetermined temperature within said housing.

2. The apparatus according to claim 1 and further including:
    door means including a horizontally swinging door hingedly connected with said one end wall for opening and closing the opening therein,
    said door having an air admitting opening.

3. The apparatus according to claim 2 in which the air draft means includes:
    motor and fan means mounted on said door; and,
    air inlet tube means connecting said motor and fan means with the air admitting opening.

4. The apparatus according to claim 3 in which said control means includes:
    thermostat means mounted on said one end wall and for monitoring the temperature in said housing and operatively connected with said motor for regulating the temperature within said housing.

5. The apparatus according to claim 4 in which said smoke control means includes:
    a smoke vent tube connected with the end portion of said firebox opposite said door,
    said tube having an opening in its wall;
    a sleeve having a wall surrounding said tube and rotatable relative to the tube,
    said sleeve having opening in its wall mating and mismating with the tube opening for opening and closing the tube opening; and,
    damper means in the upper end portion of said tube for restricting the rate of flow of smoke and heat from said firebox to the atmosphere.

* * * * *